(12) United States Patent
Wong

(10) Patent No.: US 7,830,115 B2
(45) Date of Patent: Nov. 9, 2010

(54) CRADLE CHARGER CONTROLLER WITH BELOW GROUND LEVEL BIASING

(75) Inventor: Chuck Wong, Union City, CA (US)

(73) Assignee: Intersil Americas Inc., Milpitas, CA (US)

( * ) Notice: Subject to any disclaimer, the term of this patent is extended or adjusted under 35 U.S.C. 154(b) by 248 days.

(21) Appl. No.: 11/856,513

(22) Filed: Sep. 17, 2007

(65) Prior Publication Data

US 2008/0252252 A1   Oct. 16, 2008

Related U.S. Application Data

(60) Provisional application No. 60/911,696, filed on Apr. 13, 2007.

(51) Int. Cl.
  H02J 7/00   (2006.01)
  H02J 7/04   (2006.01)
  H02J 7/16   (2006.01)

(52) U.S. Cl. .................. 320/108; 320/132; 320/128; 320/152

(58) Field of Classification Search .................. 363/81, 363/84, 125; 320/152, 160, 108
See application file for complete search history.

(56) References Cited

U.S. PATENT DOCUMENTS

| | | | |
|---|---|---|---|
| 5,422,560 A | 6/1995 | Yan | |
| 5,486,750 A | 1/1996 | Walborn et al. | |
| 5,646,501 A | 7/1997 | Fishman et al. | |
| 6,683,438 B2 * | 1/2004 | Park et al. | 320/108 |
| 7,425,816 B2 * | 9/2008 | Meyer et al. | 320/141 |
| 2008/0150487 A1 * | 6/2008 | Liu et al. | 320/134 |

* cited by examiner

*Primary Examiner*—Edward Tso
*Assistant Examiner*—Ahmed Omar
(74) *Attorney, Agent, or Firm*—Howison & Arnott, L.L.P.

(57) ABSTRACT

A cradle charging system comprises a charging cradle defining a space for a battery of an electronic device. Transformer charging circuitry for charging the battery in the electronic device includes a primary side circuitry for receiving a charging voltage. Secondary side circuitry inductively couples the charging voltage to the battery. The secondary side circuitry provides a controlled output signal based on either constant voltage control or constant current control responsive to a charge level of the battery.

22 Claims, 3 Drawing Sheets

CRADLE CHARGER CONTROLLER WITH BELOW GROUND LEVEL BIASING

CROSS-REFERENCE TO RELATED APPLICATIONS

This application claims priority from U.S. Provisional Application Ser. No. 60/911,696 filed Apr. 13, 2007, entitled CRADLE CHARGER CONTROLLER WITH BELOW GROUND LEVEL BIASING, which is incorporated herein by reference.

TECHNICAL FIELD

The present invention relates to cradle charging controllers, and more particularly, to a cradle charging controller providing below ground level biasing.

BACKGROUND

In recent years, there has been a growing demand in battery chargers for handheld electronic devices such as digital cameras, digital camcorders, PDAs, MP3 players, etc. Due to the increasing functionalities of these electronic devices, the battery capacity has also been increasing accordingly. The proliferation of portable electronic devices has greatly increased the need for various types of charging schemes by which the portable electronic devices may be charged. The use of linear charging techniques, where an isolated AC to DC converter followed by a linear regulator is used (often to as a two-pass scheme) to charge the battery of the portable electronic device has become difficult to accommodate due to the high charging current requirements. In an AC to DC converter, the adapter is plugged in to the portable electronic device to enable charging of the battery therein.

Another type of charging device has utilized a one-pass charging scheme where the AC to DC converter directly charges the battery without a linear regulator. In this configuration, the portable electronic devices are placed within a cradle configured to receive the portable electronic device, and the battery is charged via some type of inductive coupling. In one-pass charging configurations a primary side of a transformer is included within the cradle charger and a secondary side of a transformer is normally associated with the portable electronic device including the battery being charged. Alternatively, the charging circuitry is contained in the cradle and a battery is placed therein.

Charging current requirements on the secondary side of a cradle charger or in linear charging techniques are often benefited by a direct control method on the secondary side of the AC to DC converter due to the fact that this control method is not restricted to the charging current and provides lower costs. A secondary side IC control may be used to control the charging operations for some portable electronic devices. The secondary side IC control is currently available within the marketplace but cannot address the issue of charging a dead or fully discharged battery. This is due to the fact that the IC controller needs a minimum bias voltage in order to function. The bias voltage is determined by the battery charging voltage of the portable electronic device. Thus, when the battery is completely discharged and a charging is attempted, the IC controller will not obtain adequate bias voltage and will not be able to function in a normal manner. Thus, some manner for enabling better control on the secondary side of a cradle charger controller when the battery of a portable electronic device is fully discharged would be greatly beneficial.

SUMMARY

The present invention, as disclosed and described herein, in one aspect thereof, comprises a cradle charging system including a charging cradle defining a space for receiving a battery of an electronic device. Transformer circuitry for charging the battery of the electronic device includes primary side circuitry that receives a primary charging voltage. Secondary side circuitry inductively couples the charging voltage to the battery. The secondary side circuitry provides a controlled output signal based on either a constant voltage control or a constant current control responsive to a charge level of the battery.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
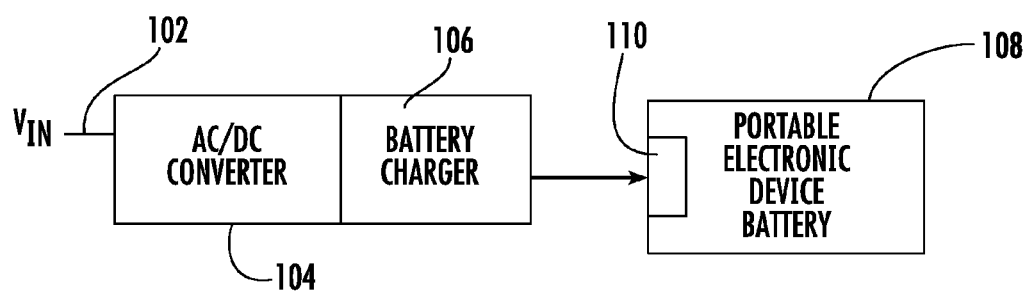
FIG. 1 is a block diagram of a linear AC to DC converter charger.

Referring now to the drawings, wherein like reference numbers are used herein to designate like elements throughout, the various views and embodiments of cradle charger controller with below ground level biasing are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a block diagram of a linear AC/DC battery charger wherein an input voltage $V_{IN}$ is applied at an input 102 to an AC to DC converter circuit 104. The input voltage is provided from, for example, an AC outlet. The AC to DC converter 104 provides an input voltage to a battery charger circuit 106 which creates a battery voltage for application to the battery 108 of a portable electronic device. The battery charger 106 is interconnected with the battery 108 through an interface 110. The battery 108 may be placed with the charger separately or as part of the portable electronic device.

Figure 2:
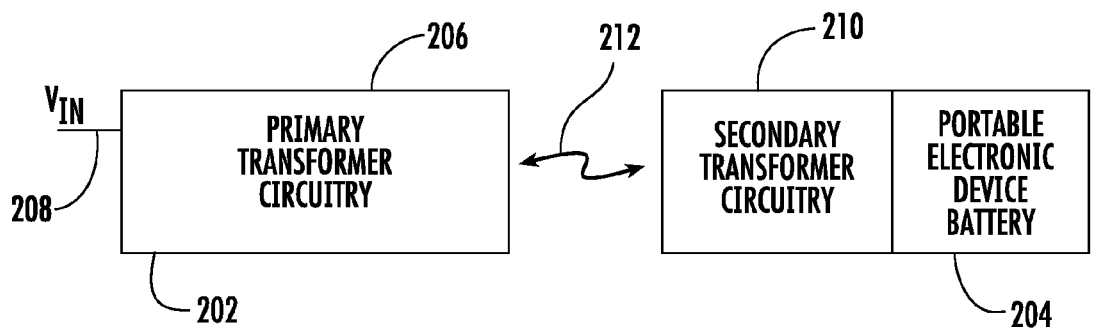
FIG. 2 is a block diagram of a cradle type battery charger.

Referring to now to FIG. 2, there is illustrated a block diagram of the configuration of a cradle type battery charger. Within a cradle type battery charger the charging circuitry includes two parts. The primary transformer side circuitry 206 generates a coupling voltage responsive to an input voltage $V_{IN}$ applied via input 208. The primary transformer circuitry 206 is inductively coupled to the secondary transformer circuitry 210 via an inductive link 212. The battery 204 of the portable electronic device 204 is charged responsive to the input voltage $V_{IN}$ applied at input 208 that is inductively coupled between the primary transformer circuitry 206 and the secondary transformer circuitry 210.

Figure 3:
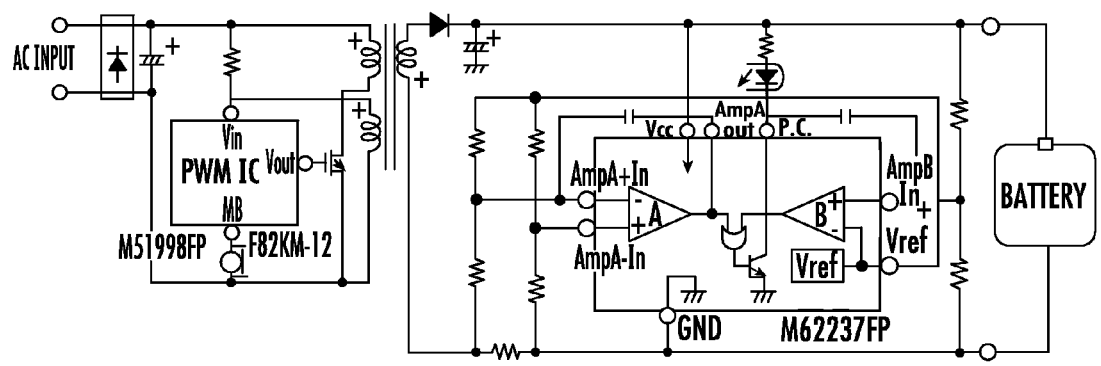
FIG. 3 illustrates a prior art embodiment for controlling a cradle type battery charger from the secondary side.

As mentioned previously, there exist some products for providing secondary side control within a cradle charger AC to DC converter. However, these products do not provide for charge control regulation when the battery is dead or discharged to a voltage below the minimum operational voltage of the secondary side controller IC. FIG. 3 illustrates one such application of the Renesas M62237. This circuit requires a minimum 2.5 output voltage in order to function. The circuit incorporates a high precision reference voltage source that is suitable for the secondary side control of chargers and switching power supplies. The circuit includes built in op amps for current and voltage control. The output of the current control op amp is connected to an external output pin which allows compensation in a stand alone mode. The operating power supply voltage range of the circuit is 2.5 volts to 15 volts. The built in high precision reference voltage source provides 1.25 volts plus or minus 1 percent. The pin out current is 20 milliamps. The circuit may be used within battery chargers, switching power supplies and secondary transformer side control.

Figure 4:
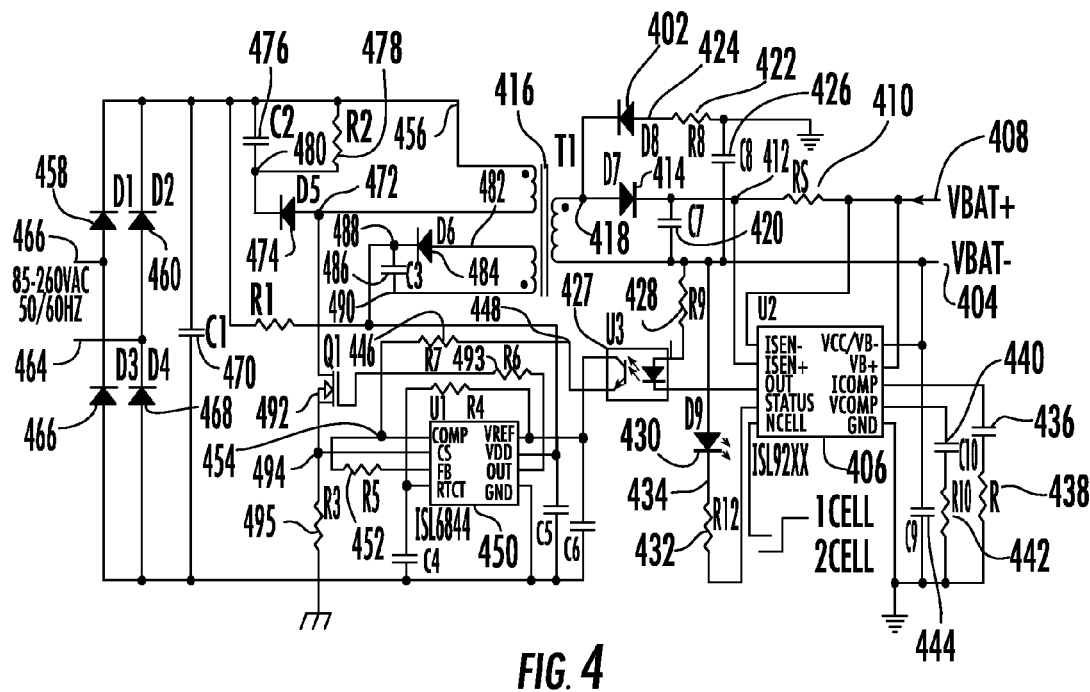
FIG. 4 illustrates a battery charging circuit including a secondary side charge control circuit.
Figure 5:
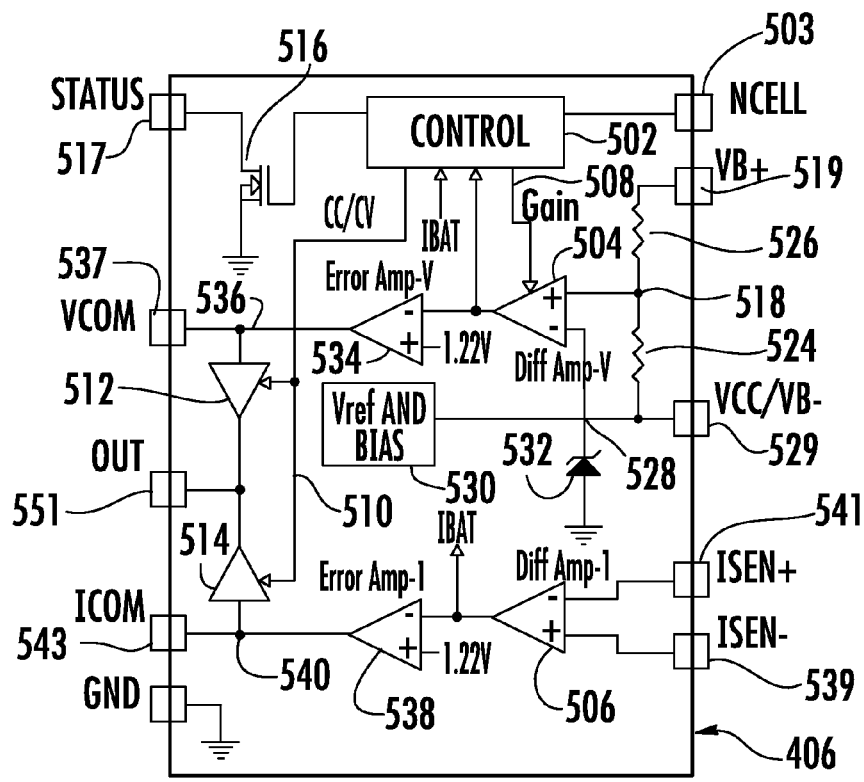
FIG. 5 is a block diagram of a controller IC for a secondary side charge control circuit as illustrated in FIG. 1.

Referring now to FIGS. 4 and 5, there are illustrated a proposed solution for providing secondary side IC control that functions when a battery is fully discharged. The circuitry includes an additional rectifier circuit 402 that is used to generate a negative voltage with respect to the negative battery terminal 404 connected to the negative terminal of an associated battery. The negative battery terminal 404 will comprise the VCC of a controller IC 406 and a negative voltage will comprise the ground reference of the controller IC 406.

Referring now more particularly to FIG. 4, a battery (not shown) is connected between a positive battery node connection 408 and a negative battery node connection 404. A current sensing resistor 410 is connected between the positive battery terminal 408 and node 412. Node 412 is connected to the ISEN+ pin of the secondary side controller IC 406. A rectifier 414 has its anode connected to the secondary side of transformer 416 at node 418. The cathode of rectifier 414 is connected to node 412. The other side of the transformer 416 is connected to the negative terminal of the battery at node 404. A capacitor 420 is connected between node 412 and the negative terminal 104 of the battery. A cathode of rectifier 402 connects to the transformer at node 418 and the anode of rectifier 402 connects to a resistor 422 at node 424. As mentioned previously, the rectifier 402 is used to generate a negative voltage with respect to the negative battery terminal 404. The other end of resistor 422 connects to ground. A capacitor 426 connects between the negative terminal 404 and ground. A resistor 428 is connected between the negative terminal 404 of the battery and anode of a LED within opto isolator 427. The cathode of the LED within the opto isolator 427 connects to the OUT pin of the secondary side controller IC 406. A status indicating LED 430 has its anode connected to the negative terminal 404 of the battery, and the cathode of LED 430 is connected to a resistor 432 at node 434. The other side of resistor 432 is connected to the status pin of the secondary side controller 406.

The secondary side controller 406 includes a number of additional pins including the ISEN− pin which is connected to the positive terminal 408 of the connected battery. The NCELL pin of the secondary side controller 406 is connected to receive a control signal indicating whether a one cell or a two cell battery is connected to the input terminals 404 and 408, respectively. The VCCNVB− pin of the secondary side controller 406 is connected to the negative terminal 406 of the battery. The VB+ pin of the secondary side controller 406 is connected to the positive terminal 408 of the battery. The ICOMP pin of the secondary side controller 406 is connected to a series combination of a capacitor 436 and a resistor 438 which is connected to ground. The VCOMP pin of the secondary side controller 406 is connected to ground through another series capacitor combination of a capacitor 440 and a resistor 442. The ground pin of the secondary side controller 406 is connected to ground. The VB+ pin of the secondary side controller 406 is connected to ground through a capacitor 444 and to the positive terminal 408 of the battery.

The opto isolator 427 is driven by the OUTPUT pin of the secondary side controller 406. The opto isolator 427 is coupled to the FB pin of the primary side controller 450 to provide voltage or current regulation. The opto isolator 427 is connected to a first resistor 446 at node 448. The resistor 446 is connected to the COMP pin of the primary side controller 450 and to a resistor 452 at node 454.

The primary side of transformer 416 is a split transformer having a first node 456 connected to a parallel connection of rectifiers 458 and 460. The rectifiers 458 and 460 have their cathodes connected to node 456. The anode of rectifier 458 is connected to a first terminal 462 of an AC input and the anode of the second rectifier 460 is connected to a second input node of the AC input voltage. A second pair of rectifiers 466 and 468 has their cathodes connected to the input terminals of the AC input voltage 462 and 464 respectively and their anodes connected to ground. A capacitor 470 is connected between node 456 and ground. A second node 472 of the transformer 416 is connected to the anode of rectifier 474. The cathode of rectifier 474 is connected to a series combination of capacitor 476 and resistor 478 which are connected between a node 480 and node 456. A third node 482 is connected to the anode of rectifier 484. A cathode of rectifier 484 is connected to a capacitor 486 at node 488. The other side of capacitor 486 is connected to the fourth node of the primary side of transformer 416 at node 490. A switching transistor 492 has its gate connected to the OUT pin of the primary side controller 450 through a resistor 493. The transistor 492 is connected between node 472 and node 494. A resistor 495 is connected between node 494 and ground. Additional biasing circuitry is included on the primary side as illustrated in FIG. 4.

Referring now to FIG. 5, there is more fully illustrated a block diagram of the secondary side controller 406. The secondary side controller 406 utilizes two differential amplifiers, a first differential amplifier 504 for output voltage sensing and a second differential amplifier 506 for output current sensing, to convert the voltage signals and current signals to the IC ground referenced signals. Control logic 502 is connected to receive control signals from the NCELL pin 503. These control signals indicate whether a one cell or a two cell battery is within the portable electronic device in which the secondary side circuitry is incorporated. The control logic 502 comprises a multiplexer that enables either output buffer 512 for voltage regulation or output buffer 514 for current regulation, depending on the voltage and current signal inputs. In order to charge a Li-ion battery constant current is first used until the battery is charged to 4.2V. The charger then switches to constant voltage and stay in constant voltage until the end of charge. Thus, the charger control logic 502 regulates a constant current output (514) for any battery voltage <4.2V. When the battery voltage rises to 4.2V, the charger control logic 502 will change to regulate constant voltage at 4.2V (512). Thus the control logic 502 receives the battery voltage signal and enables either 512 or 514 using the 4.2V threshold. The control logic 502 also monitors the output of the voltage differential amplifier 504 and the output of the current differential amplifier 506. The control logic 502 provides a gain control signal to the differential amplifier 504 on control line 508 to set the appropriate gain according the number of cell of the battery from the NCELL input 503. Control signals are provided to the enable control of the output buffers 512 and 514 via a control line 510. The control logic 502 also applies a control output to the gate of transistor 516. Transistor 516 is an open-drain FET connected between the status pin 517 and ground. The status-pin 517 provides an indication of charge completion of the battery in the electronic device.

The voltage differential amplifier 504 has its non-inverting input connected to node 518. Resistor 526 is connected between node 518 and the VB+ pin 519. Resistor 224 is connected between node 218 and the node 528 which is connected to the VCCNVB– pin 529. VREF and bias circuit 530 is connected to node 528 and provides reference and bias voltage to the inverting input of the voltage differential amplifier 504. A zener diode 532 is connected between node 528 and ground. The output of the voltage differential amplifier 504 is connected to the inverting input of voltage error amplifier 534. The non-inverting input of the voltage error amplifier 534 is connected to a 1.22 bandgap volt reference. The output of the voltage error amplifier 534 is connected to the input of buffer 512 at node 536 and to the VCOM pin 537 for connection of an external compensation network.

The current differential amplifier 506 has its inverting input connected to the ISEN+ pin 541. The non-inverting input of the current differential amplifier 506 is connected to the ISEN– pin 539. The output of the current differential amplifier 506 is connected to the inverting input of a current error amplifier 538. The non-inverting input of the current error amplifier 538 is connected to a 1.22 volt bandgap reference voltage. The output of the current error amplifier 538 is connected to the input of the buffer 514 at node 540 and also to the ICOM pin 543 for connection of an external compensation network.

The secondary side IC controller 406 of FIG. 5 can accommodate one or two cell applications by toggling the NCELL pin 503 high or low. The control logic 502 will adjust the gain of the voltage differential amplifier 504 according to the logic value applied to the NCELL pin 503. The final charging voltage will be regulated at 4.2 volts or 8.4 volts for one cell or two cell applications, respectively. The current differential amplifier 506 has a fixed gain and the charging current is programmed by the external sense resistor 410 (FIG. 4). The secondary side controller IC 406 uses the two GM amplifiers 512 and 514 one for voltage regulation 512 and the other for current regulation 514. Two separate compensation networks are needed to provide a stable operation both constant current and constant voltage modes.

The OUTPUT pin 551 of the secondary side controller IC 406 is driven either by the voltage error amplifier 534 or the current error amplifier 538 depending on whether the constant current or constant voltage is required. This is achieved by selecting the buffer 512 if the OUTPUT pin 551 is to be driven by the voltage error amplifier 534 or by selecting the buffer 514 if the OUTPUT pin 551 is to be driven by the current error amplifier 538. The selection of either the buffer 512 or the amplifier 514 is achieved responsive to a control signal provided on line 510 from the control logic 502. The OUTPUT pin 551 drives the LED of the Opto Isolator circuit 427 (FIG. 4) which couples to the FB pin of the primary side IC controller 450 (FIG. 4) to provide voltage or current regulation. A STATUS pin 517 indicates the charging state of the secondary side controller IC 406 depending on the charging current. The open drain FET 516 will be turned on when the charging current is above the end of charge current (fixed at ten percent of the fast charge current), otherwise it is turned off to indicate the end of charge condition.

The above-described circuitry provides the ability to charge a dead or deeply discharged battery which is not available in current circuitry configurations. This would be greatly beneficial within various applications as portable electronic devices are often completely discharged during operation and recharging from a completely dead battery state is required.

It will be appreciated by those skilled in the art having the benefit of this disclosure that this invention provides a cradle charging controller providing below ground level biasing. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A cradle charging system, comprising:
a charging cradle defining a space for receiving a battery of an electronic device;
a transformer charging circuitry for charging the battery in the electronic device, the transformer charging circuitry further comprising:
primary side circuitry for receiving a charging voltage;
secondary side circuitry for inductively coupling the charging voltage to the battery, wherein the secondary side circuitry provides a controlled output signal based on either constant voltage control or constant current control responsive to a charge level of the battery, wherein the secondary side circuitry has a negative voltage for a ground reference, wherein the secondary side circuitry has a negative voltage for a ground reference; and
a control circuit for generating the controlled output signal responsive to at least one of a sensed charging voltage to the battery and a sensed charging current to the battery, wherein the control circuit generates a voltage control signal as the controlled output signal responsive to the sensed charging voltage and a reference voltage in a first mode of operation and wherein the control circuit generates a current control signal as the controlled output signal responsive to the sensed charging current and the reference voltage in a second mode of operation.

2. The cradle charging system of claim 1, wherein the secondary side circuitry further includes a control circuit for generating the controlled output signal responsive to either a monitored charging voltage of the battery or a monitored charging current of the battery.

3. The cradle charging system of claim 2, wherein the control circuit further generates the controlled output signal responsive to a battery control signal indicating whether the battery is a one cell or a two cell battery.

4. The cradle charging system of claim 2, further including an opto-isolator circuit for linking the controlled signal from the secondary side circuitry to the primary side circuitry.

5. The cradle charging system of claim 2, wherein the control circuit further generates a status signal indicating a charging state of the battery.

6. The cradle charging system of claim 2, wherein the control circuit further controls a gain of the monitored charging voltage.

7. The cradle charging system of claim 1, wherein the secondary side circuitry further includes a rectifier circuit to generate a negative voltage with respect to a negative battery terminal of the secondary side circuitry to provide the negative voltage for the ground reference.

8. A cradle charging system, comprising:
  a charging cradle defining a space for receiving a battery of an electronic device;
  a transformer charging circuitry for charging the battery in the electronic device, the transformer charging circuitry further comprising:
    primary side circuitry for receiving a charging voltage;
    secondary side circuitry for inductively coupling the charging voltage to the battery, wherein the secondary side circuitry provides a controlled output signal based on either constant voltage control or constant current control responsive to a charge level of the battery wherein the secondary side circuitry has a negative voltage for a ground reference; and
    a control circuit for generating the controlled output signal responsive to a battery control signal indicating whether the battery is a one cell or a two cell battery and to either a monitored charging voltage of the battery or a monitored charging current of the battery, the control circuit further comprising:
      a first differential amplifier for sensing an output voltage to the battery;
      a second differential amplifier for sensing an output current to the battery;
      a first error amplifier for generating a voltage control signal responsive to the sensed output voltage of the first differential amplifier and a reference voltage;
      a second error amplifier for generating a current control signal responsive to the sensed output current of the second differential amplifier and the reference voltage;
      a first output driver for outputting the voltage control signal as the controlled output signal responsive to an enable signal at a first logical level;
      a second output driver for outputting the current control signal as the controlled output signal responsive to the enable signal at the second logical level, and
      control logic for generating the enable signal at the second logical level when the output voltage is below a predetermine level and at the first logical level when the output voltage is above the predetermined level, wherein the predetermined level is established responsive to the battery control signal.

9. The cradle charging system of claim 8, further including an opto-isolator circuit for linking the controlled signal from the secondary side circuitry to the primary side circuitry.

10. The cradle charging system of claim 8, wherein the control logic further generates a status signal indicating a charging state of the battery.

11. The cradle charging system of claim 8, wherein the control logic further controls a gain of the first differential amplifier.

12. The cradle charging system of claim 8, wherein the secondary side circuitry further includes a rectifier circuit to generate a negative voltage with respect to a negative battery terminal of the secondary side circuitry to provide the negative voltage for the ground reference.

13. A method for charging a battery using a cradle charger circuit, comprising the steps of:
  monitoring a charging voltage applied to the battery;
  monitoring a charging current applied to the battery; generating a voltage control signal responsive to the monitored charging voltage and a reference voltage;
  generating a current control signal responsive to the monitored charging current and a reference voltage;
  outputting the voltage control signal as a control signal to a primary side of cradle charger circuit when the charging voltage is above a predetermined level;
  outputting the current control signal as the control signal to the primary side of cradle charger circuit when the charging voltage is below the predetermined level;
  controlling charging of the battery responsive to the control signal; and
  generating a negative voltage for a ground reference with respect to a negative battery terminal of a second side circuitry of a transformer circuit.

14. The method of claim 13, wherein the step of controlling further includes the step of linking the control signal from a secondary side circuitry of a transformer to the primary side circuitry of the transformer.

15. The method of claim 13, further including the step of generating a status signal indicating a charging state of the battery.

16. The method of claim 13, further including the step of controlling a gain of the monitored charging voltage.

17. The method of claim 13 further including the step of establishing the predetermined level responsive to an indication of a number of cells of the battery.

18. The cradle charging system of claim 1, wherein a first number of battery cells enables the first mode of operation and a second number of battery cells enables the second mode of operation.

19. A control chip for controlling a secondary side of a transformer charging circuit, comprising:
  a battery voltage input for receiving a sensed charging voltage of a battery being charged by the transformer charging circuit;
  at least one current input for receiving a sensed charging current to the battery being charged by the transformer charging circuit;
  at least one control output for providing a controlled output signal;
  a control circuit for generating the controlled output signal to control the secondary side of a transformer charging circuit, the secondary side having a negative voltage for a ground reference, responsive to at least one of the sensed charging voltage to the battery and the sensed charging current to the battery, wherein the control circuit generates a voltage control signal as the controlled output signal responsive to the sensed charging voltage and a reference voltage in a first mode of operation and wherein the control circuit generates a current control signal as the controlled output signal responsive to the sensed charging current and the reference voltage in a second mode of operation.

20. The control chip of claim 19, wherein the control circuit further generates the controlled output signal responsive to a battery control signal indicating whether the battery is a one cell or a two cell battery.

21. The control chip of claim 19, wherein the control circuit further generates a status signal indicating a charging state of the battery.

22. The control chip of claim 19, wherein the control circuit further controls a gain of the monitored charging voltage.

* * * * *